US007558761B2

(12) United States Patent
Kummer, Jr. et al.

(10) Patent No.: US 7,558,761 B2
(45) Date of Patent: Jul. 7, 2009

(54) METHOD AND SYSTEM FOR AUTOMATICALLY ASSOCIATING A MANUALLY ENTERED POSTAGE AMOUNT TO A CLASS OF SERVICE

(75) Inventors: Robert H. Kummer, Jr., Southbury, CT (US); Jacques E. Hasbani, Easton, CT (US)

(73) Assignee: Pitney Bowes Inc., Stamford, CT (US)

( * ) Notice: Subject to any disclaimer, the term of this patent is extended or adjusted under 35 U.S.C. 154(b) by 1226 days.

(21) Appl. No.: 10/664,674

(22) Filed: Sep. 18, 2003

(65) Prior Publication Data

US 2005/0065895 A1 Mar. 24, 2005

(51) Int. Cl.
*G07B 17/00* (2006.01)
*G07B 17/02* (2006.01)
*G06F 17/00* (2006.01)
*G06Q 10/00* (2006.01)

(52) U.S. Cl. ....................... 705/401; 705/404; 705/409; 705/410

(58) Field of Classification Search ................. 705/400, 705/1, 60–62, 401–411
See application file for complete search history.

(56) References Cited

U.S. PATENT DOCUMENTS 4,829,443 A * 5/1989 Pintsov et al. ............... 705/406
5,072,397 A * 12/1991 Barns-Slavin et al. ....... 705/402
5,117,364 A 5/1992 Barns-Slavin et al.
5,602,742 A * 2/1997 Solondz et al. ............ 705/410
5,661,653 A 8/1997 Kulik
5,699,258 A 12/1997 Thiel
5,729,459 A 3/1998 Brandien et al.
5,842,186 A 11/1998 Kulik
6,035,291 A 3/2000 Thiel
6,286,009 B1 * 9/2001 Mattioli et al. .............. 707/102
6,321,214 B1 11/2001 Thiel
6,643,694 B1 * 11/2003 Chernin ...................... 709/223
2003/0037008 A1 * 2/2003 Raju et al. .................... 705/60

FOREIGN PATENT DOCUMENTS

EP 0543395 A2 5/1993
GB 1508623 4/1978

OTHER PUBLICATIONS

Bleumer, Secure PC-Franking for Everyone, Francotyp-Postalia, 2000.*

* cited by examiner

*Primary Examiner*—John W Hayes
*Assistant Examiner*—Daniel P Vetter
(74) *Attorney, Agent, or Firm*—Brian A. Lemm; Angelo N. Chaclas

(57) ABSTRACT

The present invention relates to a method for processing mail pieces to automatically associate a manually entered postage to a class of service and to a system which implements the method. The method includes receiving a postage amount that is to be applied to the mail pieces and searching stored rate tables for one or more classes of service having a postage rate that matches the entered postage amount. The matching classes of service are displayed and the user selects one of the classes of service. The entered postage amount is applied to the mail pieces and transaction information for each is stored. A corresponding weight for each of the matching classes of service may also be displayed to the user. Mail pieces may be processed individually or in a batch using the discussed method and system.

15 Claims, 4 Drawing Sheets

METHOD AND SYSTEM FOR AUTOMATICALLY ASSOCIATING A MANUALLY ENTERED POSTAGE AMOUNT TO A CLASS OF SERVICE

FIELD OF THE INVENTION

The invention disclosed herein relates generally to mailing processing systems, and more particularly to a system and method for automatically associating a manually entered postage amount to a class of service.

BACKGROUND OF THE INVENTION

Mail processing systems, such as, for example, a mailing machine, often include different modules that automate the processes of producing mail pieces. The typical mailing machine includes a variety of different modules or sub-systems each of which performs a different task on the mail piece. The mail piece is conveyed downstream utilizing a transport mechanism, such as rollers or a belt, to each of the modules. Such modules could include, for example, a singulating module for separating a stack of mail pieces such that the mail pieces are conveyed one at a time along the transport path, a stripping/moistening module for stripping open the flap of an envelope, and wetting and sealing the glued flap of an envelope, a weighing module for weighing the mail piece, and a metering/printing module for storing postage amounts and applying evidence of postage either directly to the mail piece or to a tape to be applied to the mail piece. The mailing machine is controlled by a central processing unit that executes software stored in memory provided in the mailing machine. The exact configuration of the mailing machine is, of course, particular to the needs of the user.

Postal authorities publish postage rate schedules based on a variety of parameters, such as the weight and/or dimensions of the mail piece, the origin and/or destination of the mail piece and the class of mail being used. A mailing machine as described above typically stores a database of information including a series of tables corresponding to the published rate schedules. In operation, a user weighs a mail piece, selects a class of service for the mail piece and then feeds the mail piece through the mailing machine. The mailing machine determines the proper postage for the mail piece using the stored tables based on the measured weight and chosen class of service and prints the proper postage either directly on the mail piece or on a tape to be applied to the mail piece.

For convenience purposes, users often desire to manually enter a known postage amount to be applied to one or more mail pieces instead of weighing each mail piece and choosing a class of service for each mail piece as described above. However, use of this mode of operation is in many cases restricted by postal authority regulations that mandate that a class of service and weight be entered, collected, reported, and in some cases printed as part of the postage indicia, for each mail piece even if a known postage amount is manually entered. Most often, users that desire to use this mode of operation know only the desired postage amount and do not know the appropriate class of service and weight to associate with each mail piece. Thus, there exists a need for a system and method for automatically associating a manually entered postage with a class of service and/or weight.

SUMMARY OF THE INVENTION

The present invention relates to a method for processing one or more mail pieces to automatically associate a manually entered postage to a class of service and to a system which implements the method. The method includes receiving a postage amount entered by a user that is to be applied to one or more mail pieces. Stored information including one or more rate tables are searched for one or more classes of service having a postage rate that matches the entered postage amount. The one or more classes of service located during the search are displayed to the user and the user selects one of the displayed classes of service. The entered postage amount is applied to the one or more mail pieces and transaction information for each of the mail pieces is stored. The transaction information includes the postage amount and the selected class of service. A corresponding weight for each of the classes of service located during the search may also be displayed to the user, and the stored transaction information may also include the weight that corresponds to the selected class of service. The selected class of service and the corresponding weight may be applied to the one or more mail pieces as part of a postage indicia. Mail pieces may be processed individually or in a batch using the method and system of the present invention.

In one embodiment, a mail processing system according to the present invention includes a postage meter for applying postage values to one or more mail pieces, a display, a central processing unit controlling operation of the postage meter and the display, and a memory for storing information including one or more rate tables and software that is executable by the central processing unit. In this embodiment, the software includes instructions for executing the method of automatically associating a manually entered postage to a class of service according to the present invention.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PREFERRED EMBODIMENTS

Figure 1:
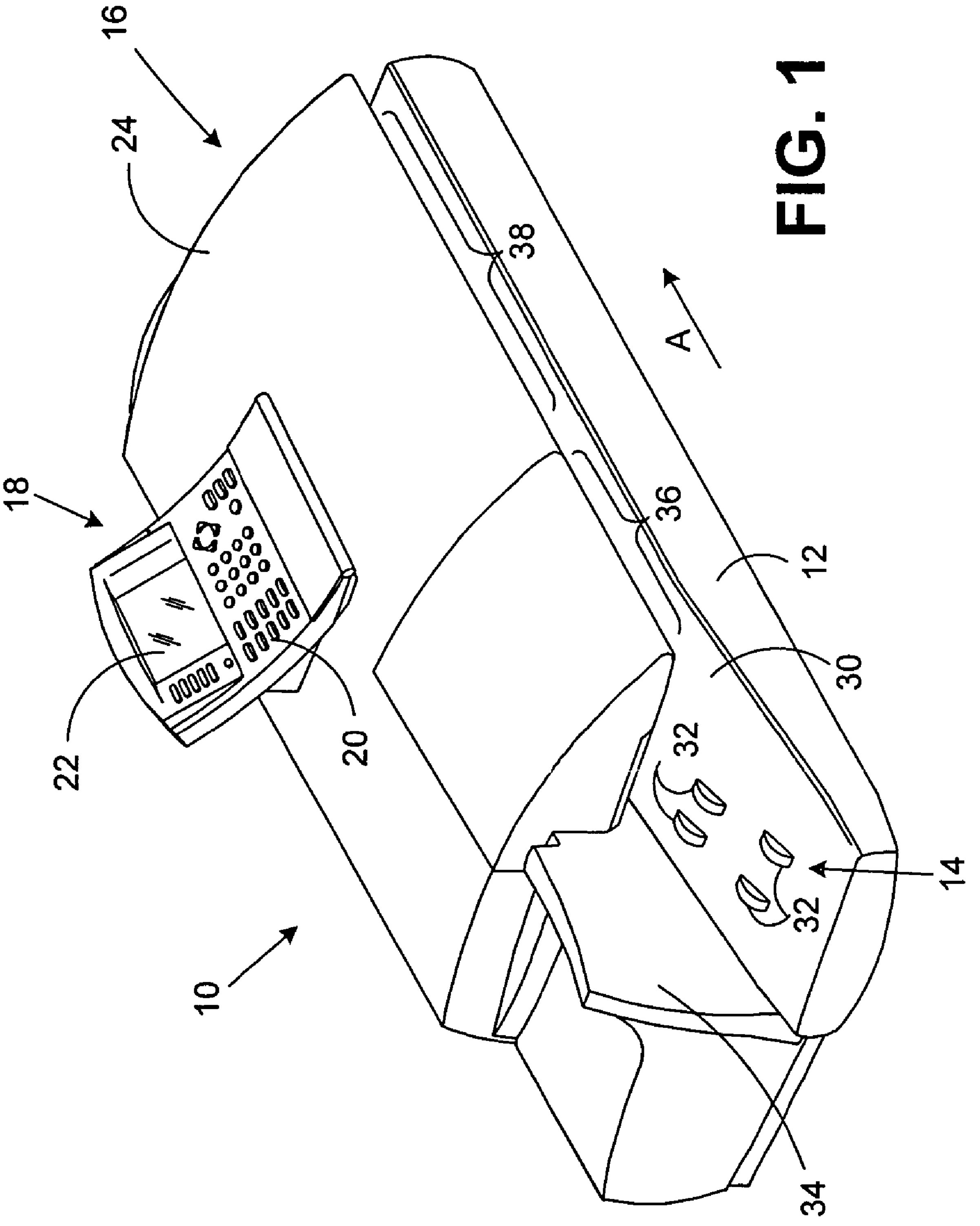
FIG. 1 is an isometric view of a mail processing system according to the present invention.

Referring to FIG. 1, an isometric view of a mail processing system 10, such as a mailing machine, according to the present invention is shown. Mailing processing system 10 comprises a base unit, designated generally by the reference numeral 12, the base unit 12 having a mail piece input end, designated generally by the reference numeral 14 and a mail piece output end, designated generally by the reference numeral 16. A UIC 18 is mounted on the base unit 12, and includes one or more input/output devices, such as, for example, a keyboard 20 and a display device 22. One or more cover members 24 are pivotally mounted on the base 12 so as to move from the closed position shown in FIG. 1 to an open position (not shown) so as to expose various operating components and parts for service and/or repair as needed.

The base unit 12 further includes a horizontal feed deck 30 that extends substantially from the input end 14 to the output end 16. A plurality of nudger rollers 32 are suitably mounted under the feed deck 30 and project upwardly through openings in the feed deck so that the periphery of the rollers 32 is slightly above the upper surface of the feed deck 30 and can exert a forward feeding force on a succession of mail pieces placed in the input end 14. A vertical wall 34 defines a mail piece stacking location from which the mail pieces are fed by the nudger rollers 32 along the feed deck 30 and into a transport system (not shown) that transports the mail pieces in a downstream path of travel, as indicated by arrow A, through one or more modules, such as, for example, a separator module and moistening/sealing module. Each of these modules is located generally in the area indicated by reference numeral 36. The mail pieces are then passed to a weighing module 42 (shown in FIG. 2) and a metering/printing module 44 (shown in FIG. 2) located generally in the area indicated by reference numeral 38, and exit the mailing processing system 10 at the output end 16.

Figure 2:
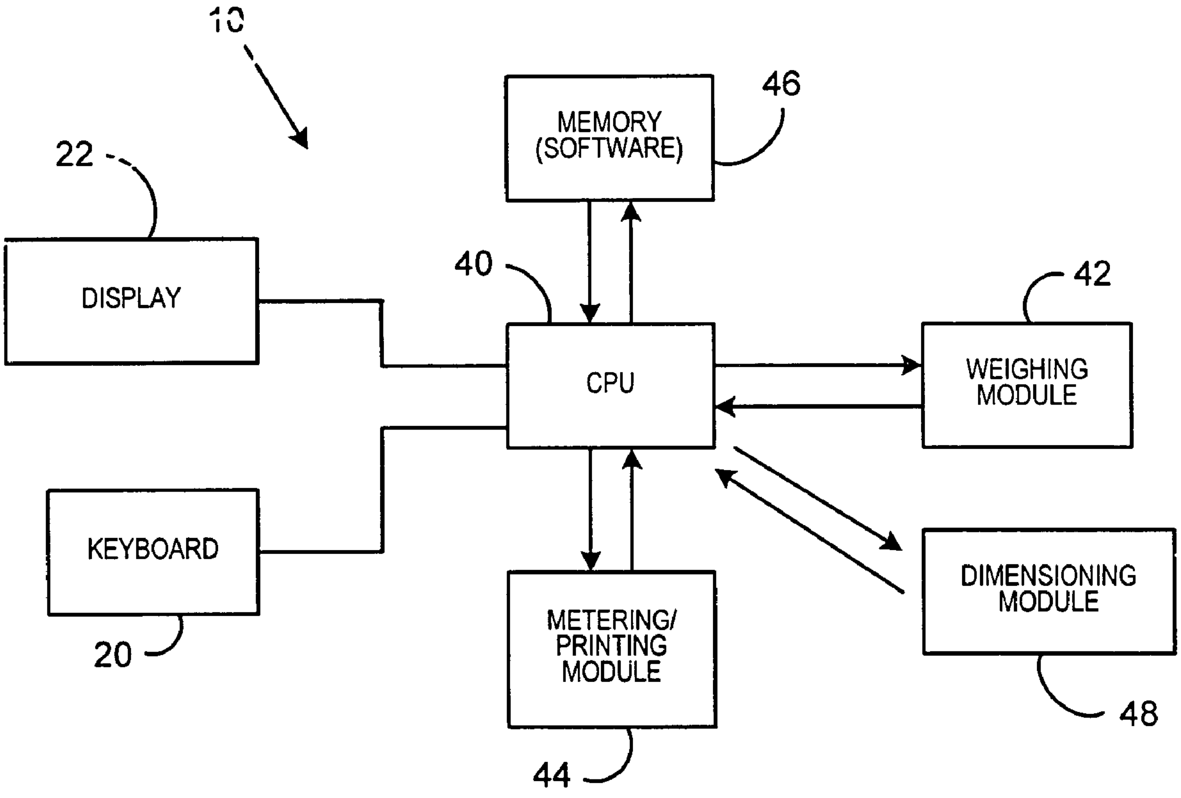
FIG. 2 is a block diagram of the mail processing system of FIG. 1.

FIG. 2 illustrates a block diagram of the mail processing system 10 illustrated in FIG. 1. As shown in FIG. 2, mail processing system 10 includes central processing unit (CPU) 40. Display device 22 and keyboard 20 provide a user interface to CPU 11. Weighing module 42, such as a scale, weighs mail pieces and metering/printing module 44, such as postage meter, applies postage to the mail pieces and manages postage amounts stored therein. CPU 40 controls all operations of mail processing system 10 as described herein based on software stored in memory 46, such as a non-volatile memory module.

Stored within memory 46 are the standard rate tables published by the relevant postal authorities that specify the postage rates for all classes of mail. Within each class of mail, the rate tables specify a particular postage amount that applies to all mail pieces falling within a particular weight range. Specifically, for each class of mail, the tables will specify a series of weight ranges delineated by a maximum weight, known as a weight break, and a corresponding level of postage for each. The weight breaks may vary for different classes of mail. Also stored within memory 46 is a processing engine executable by CPU 40 that provides appropriate access to the data provided in the database of information stored in memory 46.

Figure 3A:
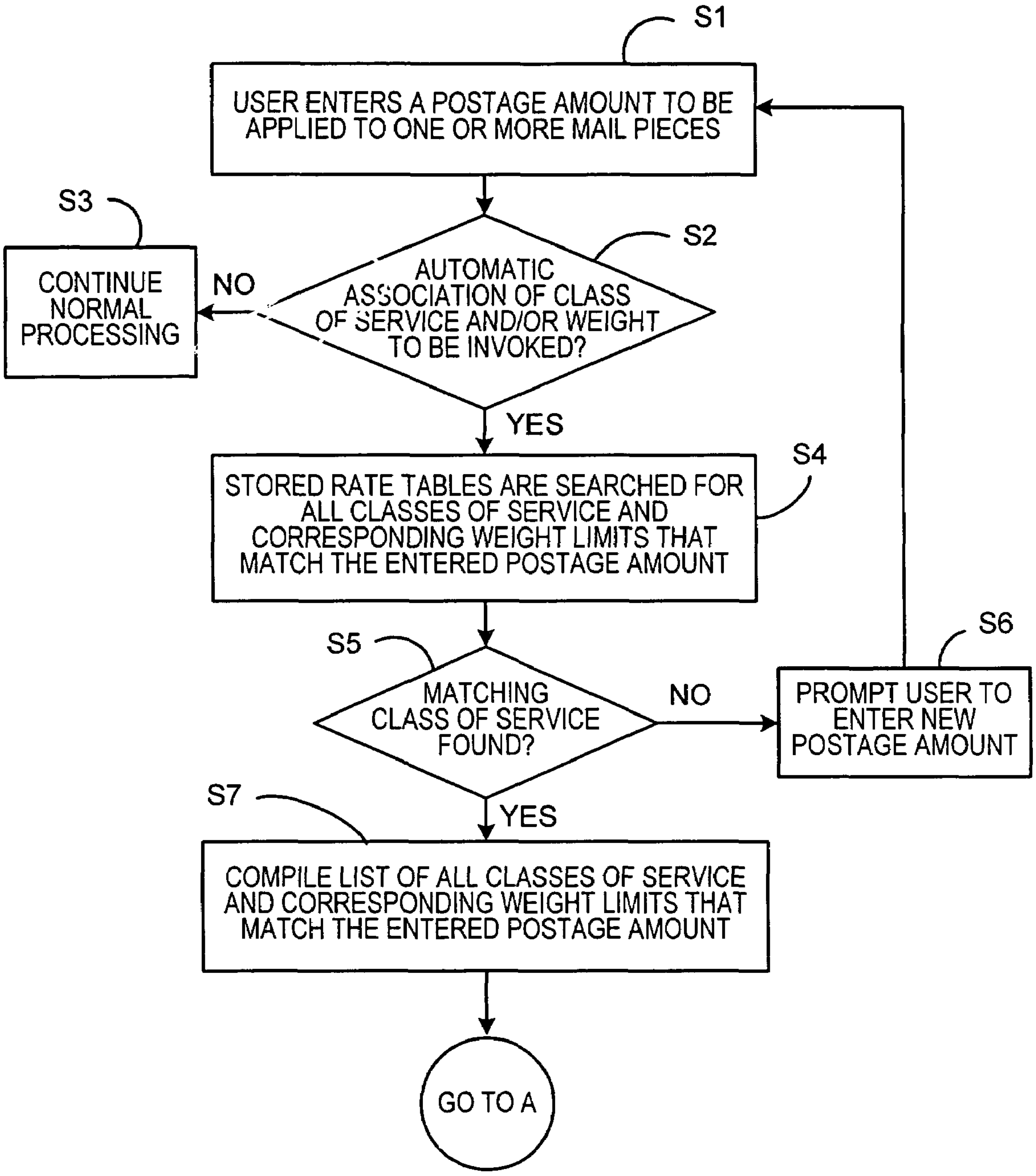
FIGS. 3A and 3B are flow diagrams illustrating the operation of the mail processing system according to the present invention.
Figure 3B:
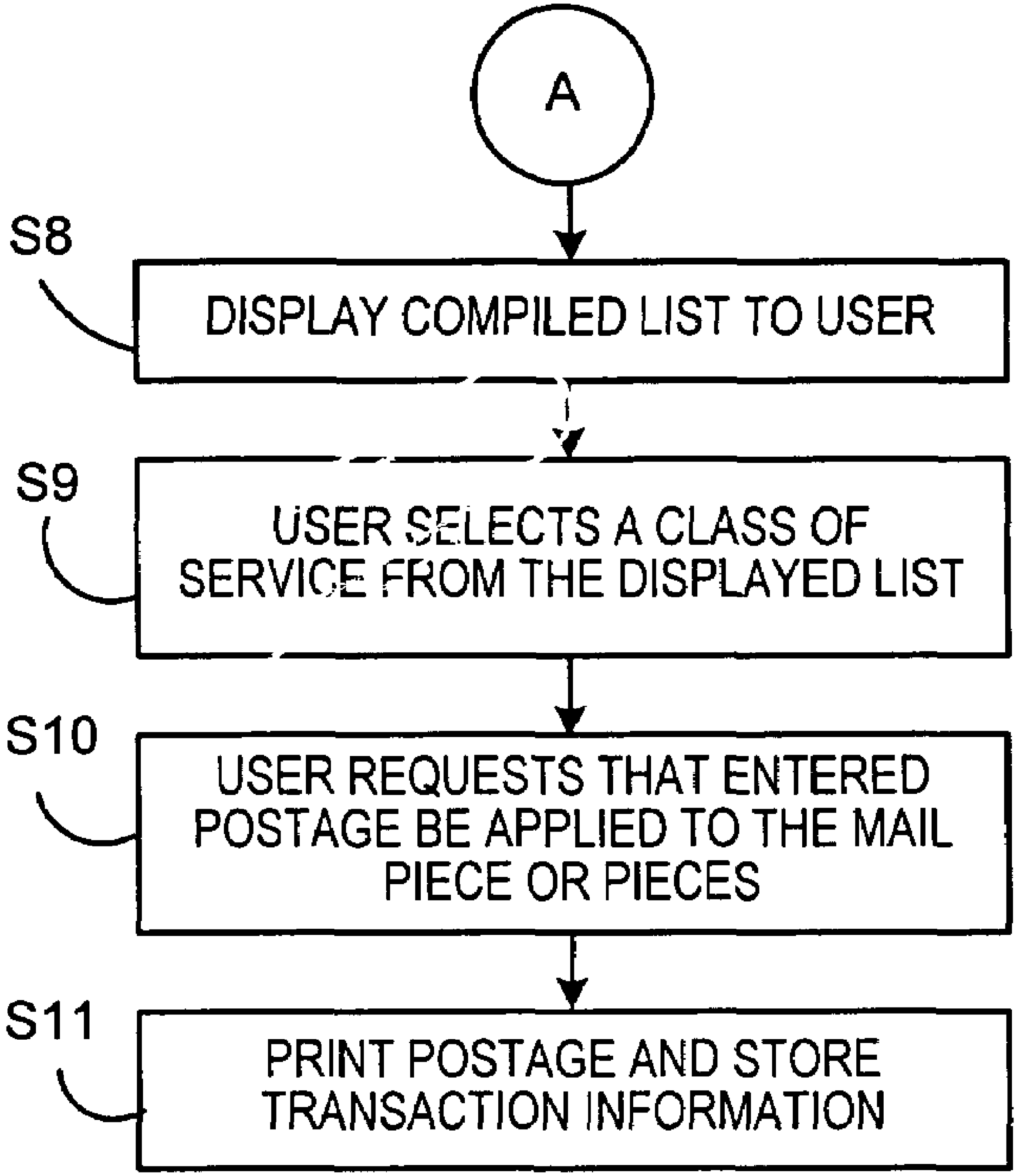

FIGS. 3A and 3B are flow diagrams illustrating the operation of mail processing system 10 according to the present invention in which a manually entered postage amount is automatically associated with a class of service and, preferably, a weight. As noted above, operation of mail processing system 10 as described in FIGS. 3A and 3B is controlled based on software that is stored in memory 46 and executed by CPU 40.

In operation, when a user desires to manually enter a known postage amount to be applied to one or more mail pieces without weighing each mail piece and choosing a class of service for each mail piece, the user, as shown in step S1, enters the known postage amount into mail processing system 10 using keyboard 20. This is common practice where a postage amount is universally known, such as the one ounce rate of $0.37 for a first class letter. At step S1, no class of service has been associated with the entered postage amount.

In step S2, a prompt is displayed on display 22 in which the user is asked whether the system for automatic association of a class of service and, preferably, weight according to the present invention should be invoked. In some countries, i.e., those countries that require class of service and weight information to be associated with each mail piece, use of such a system may be mandatory. Where class association is mandatory, step S2 may be skipped altogether. If the answer in step S2 is no, then, at step S3, normal processing continues with the postage amount entered in step S1 being applied to the mail pieces without associating a class of service and/or weight thereto as contemplated by the present invention. If the answer in step S2 is yes, then, in step S4, CPU 40 conducts a search of all of the rate tables stored in memory 46 for all possible classes of service and, preferably, corresponding weight breaks that have a rate that matches the postage amount entered in step S1.

At step S5, a determination is made as to whether any matching classes of service and weight limits have been found. If no matching classes of service are found, then in step S6, an error message is displayed to the user on display 22 and the user is prompted to enter a new postage amount at step S1. If the answer in step S5 is yes, a list of all matching classes of service and corresponding weight breaks is compiled at step S7.

Referring to FIG. 3B, the list generated in step S7 is, at step S8, displayed to the user on display 22. In step S9, the user selects a class of service and, preferably, corresponding weight break from the list using keyboard 20 or alternatively a touch-screen or the like provided on display 22. Once the user selects a class of service and, preferably, corresponding weight break, CPU 40 readies metering/printing module 44 to print the postage amount entered in step S1. In step S10, the user, when ready, requests that the entered postage be printed either on the mail piece or on a tape to be applied to the mail piece. Alternatively, the user may have pre-selected whether the postage is to be printed on a mail piece or on a tape for all mail pieces in a batch, and step S10 can be omitted. In step S11, the entered postage is printed and transaction information for each mail piece, including the postage amount applied, the class of service and, preferably, the corresponding weight break, is stored in memory 46 for accounting purposes and subsequent reporting to the appropriate postal authority as required by that postal authority's regulations. Each of steps S1 through S11 may be performed for individual mail pieces or for a batch of mail pieces that are all to have the same known postage applied thereto.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for processing one or more mail pieces, comprising:

performing by a mail processing system, the steps of:

receiving a postage amount entered by a user, said postage amount to be applied to said one or more mail pieces;

searching stored information including one or more rate tables for one or more classes of service having a postage rate that matches said postage amount;

if no class of service having a postage rate that matches said postage amount is found, displaying an error message;

if one or more classes of service having a postage rate that matches said postage amount is found, displaying said found one or more classes of service to said user;

receiving a selected class of service, said selected class of service being selected by said user from said displayed one or more classes of service;

applying said postage amount to said one or more mail pieces; and storing transaction information for each of said one or more mail pieces, said transaction information including said postage amount and said selected class of service.

2. A method according to claim 1, wherein said displayed one or more classes of service each have a weight that corresponds to said postage amount, said transaction information further including said weight for said selected class of service.

3. A method according to claim 2, said displaying step further comprising displaying each of said weights along with said one or more classes of service.

4. A method according to claim 2, wherein said selected class of service and said weight for said selected class of service are applied to said one or more mail pieces.

5. A method according to claim 1, wherein after said postage amount is received, said method further comprises prompting said user to indicate a desire to associate said postage amount with one of said one or more classes of service, and proceeding to said searching step only if said user provides an indication of said desire.

6. A method according to claim 1, wherein said selected class of service is applied to said one or more mail pieces.

7. A method according to claim 1, said one or more mail pieces comprising a batch of mail pieces.

8. A mail processing system, comprising:

a metering/printing module for applying postage values to one or more mail pieces;

a display;

a central processing unit controlling operation of said metering/printing module and said display; and a memory storing information including one or more rate tables and software executable by said central processing unit, said software including instructions for:

(a) receiving a postage amount entered by a user, said postage amount to be applied to said one or more mail pieces;

(b) searching said information for one or more classes of service having a postage rate that matches said postage amount;

(c) if no class of service having a postage rate that matches said postage amount is found, displaying an error message;

(d) if one or more classes of service having a postage rate that matches said postage amount is found, displaying said found one or more classes of service on said display;

(e) receiving a selected class of service, said selected class of service being chosen by said user from said displayed one or more classes of service;

(f) causing said metering/printing module to apply said postage amount to one of said one or more mail pieces or a tape to be applied to said one or more mail pieces; and (g) storing transaction information for each of said one or more mail pieces, said transaction information including said postage amount and said selected class of service.

9. A mail processing system according to claim 8, wherein said displayed one or more classes of service each have a weight that corresponds to said postage amount, said transaction information further including said weight for said selected class of service.

10. A mail processing system according to claim 9, said instructions for displaying further comprising instructions for displaying each of said weights along with said one or more classes of service.

11. A mail processing system according to claim 8, said one or more mail pieces comprising a batch of mail pieces.

12. A mail processing system according to claim 8, said software further including instructions for after receiving said postage amount, prompting said user to indicate a desire to associate said postage amount with one of said one or more classes of service, said central processing unit executing instructions (b) through (g) only if said user provides an indication of said desire.

13. A mail processing system according to claim 8, further comprising an input device for enabling said user to enter said postage amount and choose said selected class of service.

14. A mail processing system according to claim 8, said instructions for causing further comprising instructions for causing said metering/printing module to apply said selected class of service to one of said one or more mail pieces or a tape to be applied to said one or more mail pieces.

15. A mail processing system according to claim 9, said instructions for causing further comprising instructions for causing said metering/printing module to apply said selected class of service and said weight for said selected class of service to one of said one or more mail pieces or a tape to be applied to said one or more mail pieces.

* * * * *